April 10, 1956     A. C. STOCKER     2,741,756
ELECTRICAL DATA STORAGE DEVICE
Filed July 16, 1953     2 Sheets-Sheet 1
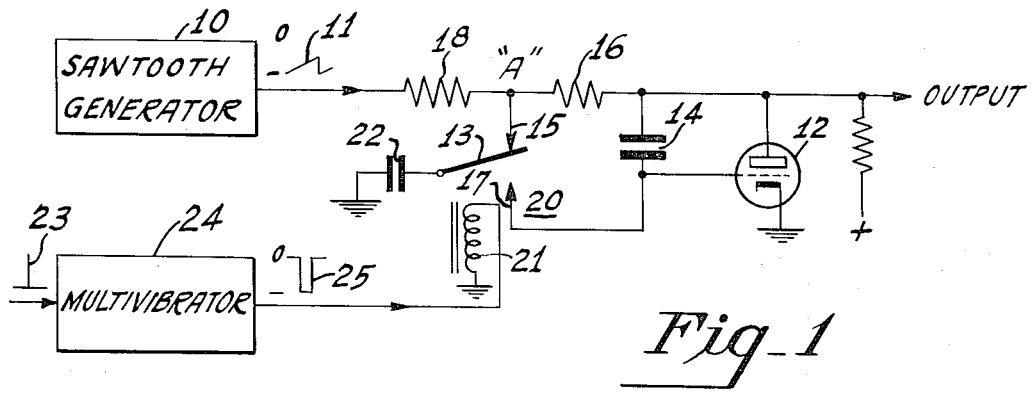
Fig_1
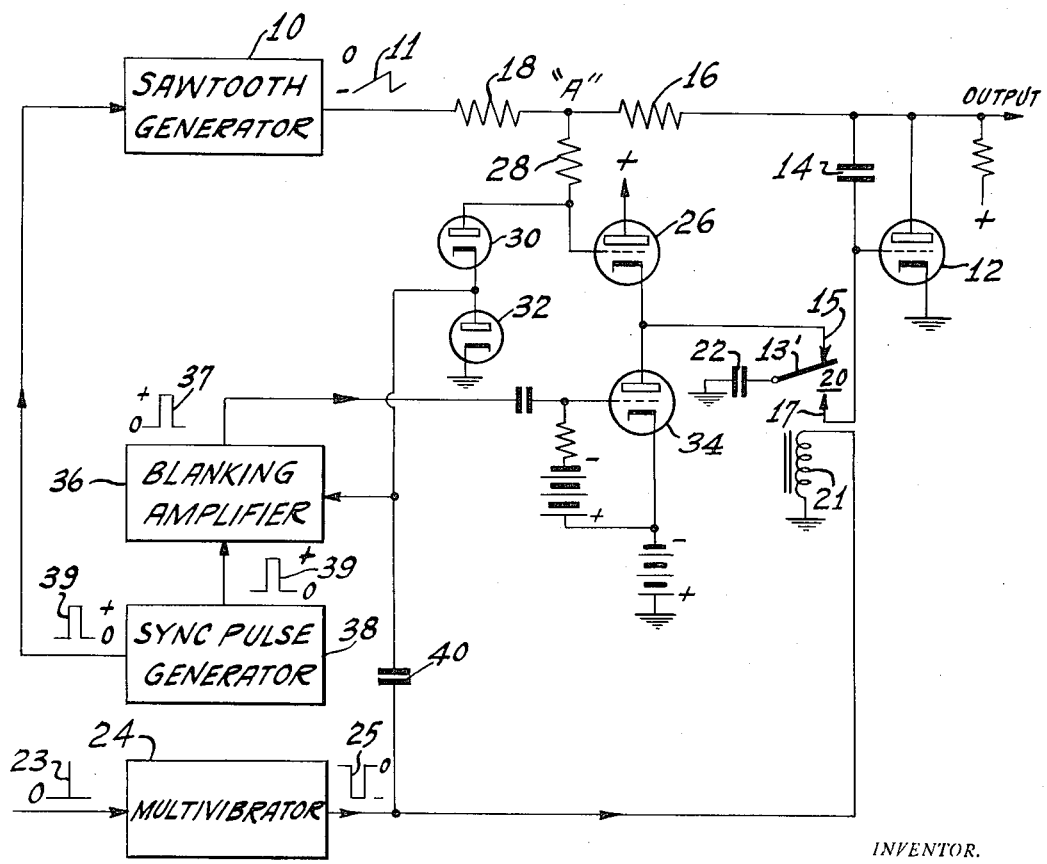
Fig_3
INVENTOR.
Arthur C. Stocker
BY *J. C. Whittaker*
ATTORNEY

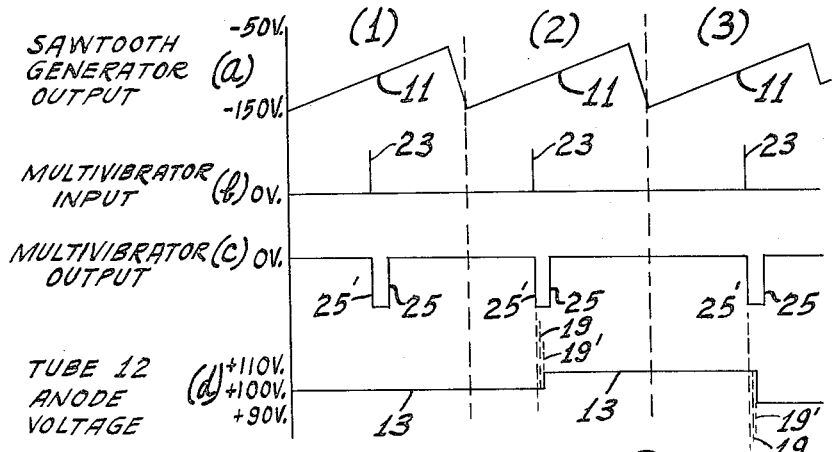
*Fig_2*
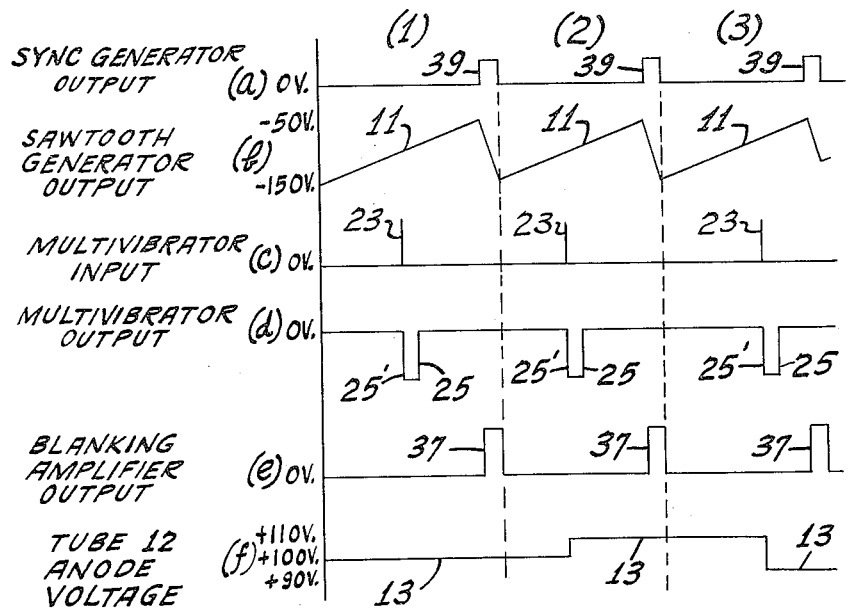
*Fig_4*
INVENTOR.
Arthur C. Stocker
BY J. C. Whittaker
ATTORNEY

United States Patent Office 2,741,756
Patented Apr. 10, 1956

2,741,756

ELECTRICAL DATA STORAGE DEVICE

Arthur C. Stocker, Collingswood, N. J., assignor to Radio Corporation of America, a corporation of Delaware Application July 16, 1953, Serial No. 368,486

7 Claims. (Cl. 340—173)

My invention relates to the storage of electrical data and particularly to the storage of such data for relatively long periods of time.

For certain purposes it is often desirable to have intermittent electrical data continuously available. For example, in a radar (radio echo detection and ranging) system electrical data relating to a particular target may be obtained once during each rotation of the radar antenna and may be displayed on a P. P. I. (plan position indicator) radar screen. It may be desirable to have the electrical data obtained during one antenna rotation available during succeeding antenna rotations. It may also be desirable to correct the electrical data during each antenna rotation and have information as to a particular target continuously available even though the target changes location between antenna rotations. The process of making such information continuously available is referred to as "automatic tracking."

Automatic tracking may be accomplished by providing a device for storing electrical data which represents the target information and by providing a switching device for supplying corrections to the stored electrical data. The quality of such a storage device depends on its ability to retain electrical data for relatively long periods of time without appreciable loss of data as a result of leakage into the associated circuits. One way in which the leakage may occur is through the switching device which supplies corrected data.

Prior hereto crystals or diode vacuum tubes have commonly been employed in such switching devices. While each of these has advantages under some circumstances, neither provides adequate isolation of the storage device from the associated circuits. High back-conduction through a crystal limits its usefulness to situations where the storage time is short or the storage device has a large capacity. While a diode vacuum tube is superior to a crystal in this respect, it also allows appreciable back-current to flow. For example, in tests of typical vacuum tubes, the measured back-current varies from about one-tenth microampere to one microampere. Where it is desirable to store electrical data for a relatively long period of time (for example, for several seconds or longer), currents of this magnitude result in undesirable leakage of electrical data from the storage device.

It is an object of my invention to provide an improved method and device for storing electrical data for a relatively long period of time without appreciable losses.

It is a further object of my invention to provide an improved storage device for retaining electrical data for relatively long periods of time and to provide means for periodically correcting the stored electrical data.

It is a further object of my invention to provide an improved storage device for electrical data whereby intermittent electrical data is continuously available and may be periodically corrected.

It is a further object of my invention to provide an improved storage device for electrical data useful in a radar system for automatic tracking and wherein intermittent electrical data representative of target information is continuously available and may be periodically corrected.

According to the invention, electrical data is supplied to a temporary storage device, such as by establishing an electrical charge in a capacitor. Then a switch quickly transfers the electrical data to a second storage device, such as a Miller memory store. The second storage device is normally isolated from the temporary storage device due to the open switch. The switch is closed for a short period of time to couple the storage devices together and thus transfer the electrical data or charge. The switch may be a mechanical switch, such as a relay, or it may be any suitable switch, such as a beam-deflection vacuum tube, having a very high back-impedance. The temporary storage device is available for relatively long intervals to receive electrical data and is required to store the electrical data in the second storage device for much shorter intervals. The second storage device stores electrical data for relatively long intervals and is required to receive electrical data during much shorter intervals. The switch may periodically couple the temporary storage device to the second storage device for a short period of time so that intermittent electrical data is continuously available and periodically corrected.

The foregoing and other objects, novel features and advantages of the invention will be more fully apparent from the following description when read in connection with the accompanying drawing wherein similar reference numerals and figures refer to similar parts and wherein:

Figure 1 is a schematic circuit diagram, partially in block form, of a first embodiment of the invention;

Figure 2 is a series of graphical illustrations referred to in explaining the embodiment of Figure 1;

Figure 3 is a schematic circuit diagram, partially in block form, of a second and preferred embodiment of the invention; and Figure 4 is a series of graphical illustrations referred to in explaining the embodiment of Figure 3.

Referring to Figure 1, the output signal 11 of a sawtooth generator 10 is applied through an input circuit to a storage device, such a a Miller memory store. The Miller store includes a normally conductive vacuum tube 12 having a storage capacitor 14 connected between its anode and control electrodes. The characteristics of the Miller store are such that the control electrode voltage of the vacuum tube 12 remains essentially constant for all values of charge on the storage capacitor 14, while the anode voltage 13 of the tube 12 is equal to the charge stored in the capacitor 14, divided by the capacitance of the capacitor 14. The value of the anode voltage 13 at any instant represents the electrical data stored in the storage capacitor 14.

A resistor 16 and a resistor 18 are connected in series between the output of the sawtooth generator 10 and the anode side of the storage capacitor 14. The anode voltage 13 of the tube 12 and the sawtooth voltage 11 are of opposite polarity, so that the voltage at a point "A" between the resistors 16 and 18 at any instant is equal to the difference between the amplitudes of the sawtooth voltage 11 and the anode voltage 13, multiplied by a constant. If, for example, the resistors 16 and 18 are of equal value, the voltage at the point "A" at any instant is equal to one-half the difference between the anode voltage 13 and the sawtooth voltage 11.

The value of the anode voltage 13 of the tube 12 may vary between two positive values (for example, from plus 90 volts to plus 110 volts, as illustrated in Figure 2d), to represent different values of electrical data stored in the capacitor 14. The output signal 11 of the sawtooth generator 10 may be a positive-going sawtooth voltage, the polarity of which is opposite to the anode voltage 13 of the tube 12. The slope portion of the sawtooth signal 11 may vary, for example, from minus 150 volts to minus 50 volts, as illustrated in Figure 2a.

A relay 20 has its contact terminals 15 and 17 connected respectively to the point "A" between the resistors 16 and 18 and the control electrode side of the storage capacitor 14 in the Miller store. A temporary storage capacitor 22 is connected between ground and the armature terminal 13' of the relay 20. As the sawtooth voltage 11 increases in a positive direction, the temporary storage capacitor 22 is charged to a value proportional to the voltage at the point "A." The voltage at the point "A" increases from a negative value to a positive value as the sawtooth voltage increases in a positive direction. For example, the voltage at the point "A" may increase from minus 25 volts to plus 25 volts as the sawtooth voltage 11 increases from minus 150 volts to minus 50 volts.

The winding 21 of the relay 20 is connected to a multivibrator 24, the output pulse 25 of which may be shaped to energize the relay 20 for a selected time interval. The multivibrator 24 may be triggered by an input signal 23 to select a time relationship between the sawtooth voltage 11 and the leading edge 25' of the multivibrator output pulse 25.

When the relay 20 is closed, any charge on the temporary storage capacitor 22 at that instant is transferred to the storage capacitor 14. In this way electrical data may be stored in the temporary storage capacitor 22 until the relay 20 is energized and closes, and then the stored charge is transferred to the storage capacitor 14 in the Miller store.

When the electrical data is transferred to the storage capacitor 14, the anode voltage 13 of the tube 12 changes. At the end of the output pulse 25 of the multivibrator 24 the relay 20 is deenergized and the temporary storage capacitor 22 is removed from the input circuit of the Miller store until the relay is energized again. Thus, the storage capacitor 14 in the Miller store is coupled to the temporary storage capacitor 22 only during the brief interval required to receive the electrical data charge from the temporary storage capacitor 22. The length of this interval is determined by the width of the output pulse 25 of the multivibrator 24.

Since the voltage at the point "A" increases from a negative value to zero and then to a positive value as the sawtooth voltage 11 increases in a positive direction, the time relationship between the sawtooth signal 11 and the leading edge 25' of the multivibrator output pulse 25 may be such as to increase, to decrease, or not to change the charge on the storage capacitor 14 in the Miller store.

The use of a mechanical switch, such as the relay 20, instead of a crystal or a vacuum diode, substantially reduces the loss of electrical data from the storage capacitor 14 in the Miller store, especially where it is desirable to store the electrical data for a relatively long interval. Also, the use of the mechanical switch according to the invention substantially isolates the storage capacitor 14 in the Miller store from the input circuit except for the brief interval when the switch is closed and corrections are being made. If desired, errors in the electrical data in the Miller store may be corrected during periodically recurring cycles of the sawtooth voltage 11.

Where the invention is employed for automatic tracking in a radar system having provision for P. P. I. display of targets, the sawtooth generator 10 may be the range sweep generator of the radar system. In such event the width of each sawtooth signal 11 is proportional to the maximum range of the radar system. The input signal 23 applied to the multivibrator 24 may be the echo pulse received from a target within the range of the radar system. Thus, the amplitude of the slope portion of the sawtooth signal 11 when the multivibrator 24 is triggered by the echo pulse 23 is proportional to the distance of the target from the radar antenna.

Referring to Figures 1 and 2, the use of the invention for automatic tracking will be explained with particular reference to the time relationship between certain voltages in the circuit of Figure 1. The sawtooth signal 11 may be repeated each time a radar pulse is transmitted. For convenience, it is assumed that one echo pulse is received during each rotation of the radar antenna and that each succeeding input signal 23 to the multivibrator 24 is the echo pulse received from a radar pulse reflected from the same target during succeeding rotations of the radar antenna. In Figure 2 the time relationship of various voltages is illustrated for three target distances: (1) where the target distance has not changed since the multivibrator 24 was last triggered; (2) where the target distance has decreased since the multivibrator 24 was last triggered; and (3) where the target distance has increased since the multivibrator 24 was last triggered. For automatic tracking the anode voltage 13 of the tube 12 should change each time the target distance changes and the change in anode voltage 13 should be proportional to the change in target distance. This requires the storage capacitor 14 in the Miller store to hold its charge without appreciable leakage during the relatively long time interval between antenna rotations. Also, the charge stored in the storage capacitor 14 should be corrected each time an echo pulse 23 is received from the target being tracked.

Where the target distance has not changed since the multivibrator 24 was last triggered, the same time relationship exists between the sawtooth signal 11 and the input signal 23 to the multivibrator 24 at the instant when the multivibrator 24 is next triggered. Since the storage capacitor 14 in the Miller store is essentially isolated from the input circuit during the relatively long interval between successive antenna rotations, the anode voltage 13 of the tube 12 is substantially equal but opposite in polarity to the amplitude of the sawtooth signal 11 when the multivibrator 24 is next triggered. The voltage at the point "A" between the resistors 16 and 18 is zero and, assuming that the relay 20 closes at the instant the multivibrator 24 is triggered, no charge is transferred from the temporary storage capacitor 22 to the storage capacitor 14 in the Miller store. As illustrated in the first cycle in Figure 2, the anode voltage 13 of the tube 12 is not changed if the range of the target has not changed since the multivibrator 24 was last triggered.

If the range of the target has decreased, the time relationship between the sawtooth signal 11 and the input signal 23 to the multivibrator 24 changes so as to cause the anode voltage 13 of the tube 12 to change to a higher positive value, as illustrated in the second cycle in Figure 2. This results because when the multivibrator 24 is triggered by the input signal 23, the instantaneous value of the sawtooth signal 11 is less positive than it was when the multivibrator 24 was triggered during the previous cycle. At this instant there is a negative voltage at the point "A" between the resistors 16 and 18. The temporary storage capacitor 22 is charged to a value determined by this negative voltage. Assuming that the relay 20 closes instantaneously when the multivibrator 24 is triggered, this charge on the capacitor 22 is transferred to the control electrode side of the storage capacitor 14 in the Miller store. This reduces the anode current of the tube 12, causing the anode voltage 13 to change to a higher positive value. This higher positive value of anode voltage 13 will be maintained during succeeding rotations of the antenna until the target range again changes.

If the range of the target increases, the time relationship between the sawtooth voltage 11 and the multivibrator input signal 23 changes so as to cause the anode voltage 13 of the tube 12 to change to a lower positive value. This results because when the multivibrator 24 is triggered by the input signal 23, the instantaneous value of the sawtooth signal 11 is more positive than it was when the multivibrator 24 was triggered during the previous cycle. At this instant there is a positive voltage at the point "A" between the resistors 16 and 18. The temporary storage capacitor 22 is charged to a value determined by this positive voltage. Assuming that the relay 20 closes instantaneously when the multivibrator 24 is triggered, this charge is transferred to the control electrode side of the storage capacitor 14 in the Miller store. This increases the anode current of the tube 12, causing the anode voltage 13 to change to a lower positive value.

During each cycle the control electrode side of the storage capacitor 14 in the Miller store is connected to the temporary storage capacitor 22 only during the brief interval when the relay 20 is closed. Since this interval is very small with respect to the total time the storage capacitor 14 is required to hold a charge, very little leakage of the charge occurs through the input circuit. Except when the relay 20 is closed, the temporary storage capacitor 22 is available to receive a charge. The storage capacitor 14 in the Miller store, however, is available to receive a charge only when the relay 20 is closed. Thus, the storage qualities of the Miller store are substantially improved by using a mechanical switch, such as the relay 20, in accordance with the invention.

While the embodiment of Figure 1 is exemplary of the general idea of the invention, certain errors in the electrical charge transferred to the storage capacitor 14 result from the fact that the relay 20 does not close instantaneously when the multivibrator 24 is triggered. The time relationship between a cycle of sawtooth signal 11 and the input signal 23 occurring during that cycle is an accurate function of the range of the target. Because the multivibrator output pulse 25 must overcome the inductance of the relay winding 21 and the inertia of the mechanical parts of the relay 20, the relay armature 13 does not break away from the contact terminal 15 until a finite time 19 after the multivibrator 24 is triggered, as illustrated in Figure 2d. Since the sawtooth signal 11 continues to rise after the multivibrator 24 is triggered, the electrical charge on the temporary storage capacitor 22 at the end of the time 19 is incorrect. Since the slope of the sawtooth signal 11 is in a positive direction, the electrical charge transferred to the storage capacitor 14 is always more positive than it should be and the anode voltage 13 of the tube 12 is always less positive than it should be.

After the relay armature 13' breaks away from the contact terminal 15 at the time 19, a further time 19' is required for the armature 13' to move from the contact terminal 15 to the contact terminal 17. During this further time 19' the temporary storage capacitor 22 is disconnected from the point "A" and is not receiving a charge. The interval between the time 19 and the time 19' represents the period during which the temporary storage capacitor 22 is required to store an electrical charge. The storage capacitor 14, however, must hold a charge for a much longer period.

In a preferred embodiment of the invention, as shown in Figure 3, the aforementioned errors are avoided and additional features are provided. The temporary storage capacitor 22 is disconnected from the point "A" substantially as soon as the multivibrator 24 is triggered by the input signal 23. This is accomplished by charging and discharging the temporary storage capacitor 22 through vacuum tubes 26 and 34, which also serve as a switch to isolate the temporary storage capacitor 22 from the point "A."

The control electrode of the tube 26 is connected through a resistor 28 to the point "A" between the resistors 16 and 18. When the multivibrator output pulse 25 is not present, the varying voltage at the point "A" appears at the control electrode of the tube 26. When the relay 20 is open, the temporary storage capacitor 22 is connected between ground and the cathode of the tube 26. As long as the voltage at the control electrode of the tube 26 is rising, the capacitor 22 is charged through the tube 26.

At the end of each cycle of sawtooth signal 11 the temporary storage capacitor 22 is discharged through the vacuum tube 34, which is connected at its anode to the relay contact terminal 15. The tube 34 is normally nonconductive because of a negative bias on its control electrode. This negative bias is overcome at the end of each cycle of sawtooth signal 11 by the positive output pulse 37 of a blanking amplifier 36, except when the multivibrator 24 is firing. The blanking amplifier 36 is triggered at the end of each cycle of the sawtooth signal 11 by the output pulse 39 of a synchronizing pulse generator 38. The output pulse 39 also triggers the sawtooth generator 10, thus synchronizing the discharge action with the sawtooth signal 11.

When the multivibrator 24 fires, the temporary storage capacitor 22 is effectively disconnected from the point "A" because the negative multivibrator output pulse 25 is applied through blocking capacitor 40 and diode vacuum tube 30 to the control electrode of the tube 26, biasing the tube 26 to cutoff. Thus, the temporary storage capacitor 22 receives no additional electrical charge between the time when the multivibrator 24 fires and the time 19 when the relay armature 13' breaks away from the relay contact terminal 15. A discharge path is provided for the blocking capacitor 40 through a diode vacuum tube 32, which is connected in series with the diode tube 30.

The multivibrator output pulse 25 is also applied through the blocking capacitor 40 to cut-off the blanking amplifier 36 and prevent the temporary storage capacitor 22 from being discharged through the tube 34 while the multivibrator 24 is firing. This is particularly necessary when the multivibrator output pulse 25 occurs near the end of a cycle of sawtooth signal 11, such as where the multivibrator 24 is triggered by an echo pulse received from a target near the maximum range of the radar system.

In Figure 4 the time relationship of various voltages in the preferred embodiment of Figure 3 is illustrated for the three target situations hereinbefore discussed with reference to Figures 1 and 2. As stated hereinbefore, it is assumed that the successive cycles of operation represent successive rotations of a radar antenna and that one echo pulse is received from a radar pulse reflected from the same target during each antenna rotation. Also, where the invention is used for automatic tracking, the time relationship between the sawtooth generator output pulse 11 and each multivibrator input signal 23 may be proportional to the distance of the same target from the radar antenna during successive antenna rotations. Since the target situations illustrated in Figures 2 and 4 are identical, the same time relationship exists in the respective cycles of operation between the sawtooth generator output pulse 11, the multivibrator input signal 23, and the multivibrator output pulse 25. The advantages of the preferred embodiment of Figure 3 are evident when the remaining curves of Figure 4 are considered.

Referring to Figures 3 and 4, the output pulse 39 of the sync pulse generator 38 triggers the sawtooth generator 10 and the blanking amplifier 36 during the return portion of each successive sawtooth signal 11, as is customary in radar design practice.

The multivibrator output pulse 25 is applied coincidentally to energize the relay 20, cut-off the blanking amplifier 36, and interrupt the charging of the temporary storage capacitor 22. The blanking amplifier output pulse 37 discharges the temporary storage capacitor 22 during the return portion of each sawtooth signal 11, except when the relay 20 is energized. The multivibrator output pulse 25 cuts off blanking amplifier 36 to prevent the temporary storage capacitor 22 from being discharged before the relay 20 actually closes after being energized. The same pulse 25 interrupts the charging of the temporary storage capacitor 22 during this brief interval.

Comparing the Figures 2 and 4, particularly with reference to the second and third cycles of operation, it is evident that the anode voltage 13 changes to a correct value in Figure 4 because the charging action of the temporary storage capacitor 22 ceases as soon as the leading edge 25' of the multivibrator output pulse 25 occurs. This is not the case in Figure 2, since in the embodiment of Figure 1 the charging of the temporary storage capacitor 22 is not interrupted until the relay armature 13' breaks away from the relay contact terminal 15 at the time 19 after the appearance of the leading edge 25' of the multivibrator output pulse 25.

Thus the invention provides an improved device for storing electrical data. Also the invention provides means whereby intermittent electrical data may be continuously available and may be corrected periodically. In particular, the invention provides an improved device for storing electrical data for a relatively long period of time without appreciable loss. The invention includes means for employing a mechanical switch, such as a relay or any suitable switch having a high back-impedance, for transferring electrical data from a temporary storage device, such as a capacitor, to a storage device having superior storage qualities, such as a Miller store. The invention also includes means for opening the circuit between the superior storage device and the temporary storage device except for a brief period of time when the switch is closed and electrical data is being transferred. In one modification the invention includes means for disconnecting the temporary storage device by electronic means during the brief interval required for the switch to operate after energy is applied to it.

What I claim is:

1. An electrical data storage circuit comprising, in combination, a substantially unshunted temporary energy storage device; an input circuit including a sawtooth wave generator separate from said temporary storage device normally connected to said temporary storage device for charging the same to a value which is proportional to the instantaneous amplitude of said sawtooth wave; a second energy storage device normally isolated from said temporary storage device; means connected to said second storage device for maintaining the latter charged to a substantially constant value; a source providing pulses in timed relation with said sawtooth wave; and switch means connected to said source and actuated by said pulses for periodically disconnecting said temporary storage device from said input circuit and connecting it to said second storage device during the respective pulse intervals for charging said second storage device to a constant value which is a function of the instantaneous charge on said temporary storage device, whereby when the phase relationship between said pulses and said sawtooth wave remains the same from pulse to pulse the constant value to which said second storage device is charged remains the same from pulse to pulse, and when the phase relationship between said pulses and said sawtooth wave changes from pulse to pulse the constant value to which second storage device is charged also changes from pulse to pulse, the sense and amplitude of each said change being functions of the sense and magnitude of each said change in phase.

2. An electrical data storage circuit as set forth in claim 1, wherein said source of pulses comprises means providing radar echo pulses, and multivibrator means connected to be actuated by said echo pulses for providing output pulses of a predetermined duration, said output pulses actuating said switch means.

3. An electrical data storage circuit as set forth in claim 1, and further including isolating means connected between said input circuit and said temporary storage device for preventing said storage device from being further charged after the instant of application of a pulse to said switch means.

4. An electrical data storage circuit as set forth in claim 3, wherein said isolating means comprise an electron discharge device having at least an anode, a control element and a cathode, said control element being connected to said sawtooth wave generator and said cathode being connected to said temporary storage device, and further including circuit means connecting said source to said control element for cutting off said discharge device during the duration of each of said pulses, whereby during the duration of each of said pulses said temporary energy storage device is prevented from being further charged through said discharge device by said sawtooth wave generator.

5. An electrical data storage circuit as set forth in claim 4, and further including discharging means connected to said temporary storage device for substantially completely discharging said device immediately after it has been charged by said sawtooth wave generator to its maximum value.

6. An electrical data storage circuit as set forth in claim 5 wherein said discharging means comprises a normally cut off second discharge device connected across said temporary storage device, and means connected to said second discharge device for rendering it conductive for a period of time which is short compared to the period of said sawtooth wave immediately after said temporary energy storage device has been charged by said sawtooth wave to its maximum value.

7. An electrical data storage circuit as set forth in claim 6 wherein said switch means comprises a relay connected to be actuated by said pulses.

References Cited in the file of this patent

UNITED STATES PATENTS

| | | |
|---|---|---|
| 2,009,459 | Turner | July 30, 1935 |
| 2,415,119 | Wellenstein | Feb. 4, 1947 |
| 2,519,898 | Gardiner | Aug. 22, 1950 |
| 2,525,872 | Dawson | Oct. 17, 1950 |
| 2,638,587 | Ballard | May 12, 1953 |
| 2,673,956 | Beard | Mar. 30, 1954 |
| 2,685,687 | Falk | Aug. 3, 1954 |
| 2,704,364 | Summers | Mar. 15, 1955 |